(12) United States Patent
Ohno

(10) Patent No.: US 10,974,345 B2
(45) Date of Patent: Apr. 13, 2021

(54) NOZZLE DEVICE AND ADDITIVE MANUFACTURING APPARATUS

(71) Applicant: Kabushiki Kaisha Toshiba, Minato-ku (JP)

(72) Inventor: Hiroshi Ohno, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 740 days.

(21) Appl. No.: 15/509,413

(22) PCT Filed: Feb. 23, 2015

(86) PCT No.: PCT/JP2015/055079
§ 371 (c)(1),
(2) Date: Mar. 7, 2017

(87) PCT Pub. No.: WO2016/042793
PCT Pub. Date: Mar. 24, 2016

(65) Prior Publication Data
US 2017/0282297 A1 Oct. 5, 2017

(30) Foreign Application Priority Data
Sep. 16, 2014 (JP) .............................. JP2014-187981

(51) Int. Cl.
*B23K 26/34* (2014.01)
*B23K 26/342* (2014.01)
(Continued)

(52) U.S. Cl.
CPC ............ *B23K 26/342* (2015.10); *B22F 3/003* (2013.01); *B22F 12/00* (2021.01);
(Continued)

(58) Field of Classification Search
CPC .......................... B23K 26/342; B23K 26/144; B23K 26/1462; B23K 26/0884
(Continued)

(56) References Cited

U.S. PATENT DOCUMENTS

| 4,229,641 A | * | 10/1980 | Ihara | ...................... B23K 9/287 |
| | | | | 219/125.1 |
| 5,134,569 A | * | 7/1992 | Masters | .................. B29C 35/08 |
| | | | | 700/182 |

(Continued)

FOREIGN PATENT DOCUMENTS

| JP | 11-114751 A | 4/1999 |
| JP | 2000-254880 A | 9/2000 |

(Continued)

OTHER PUBLICATIONS

International Search Report dated Mar. 31, 2015 in PCT/JP2015/055079.

*Primary Examiner* — Robert J Utama
*Assistant Examiner* — Ayub A Maye
(74) *Attorney, Agent, or Firm* — Oblon, McClelland, Maier & Neustadt, L.L.P.

(57) ABSTRACT

A nozzle device includes three or more rail members, three or more slider members, three or more arm members, a nozzle portion, and a drive mechanism. The three or more rail members each includes rails parallel with each other. The three or more slider members are connected to the rail members to be movable along the rails, respectively. The three or more arm members are connected to the slider members, and movably and rotatably supported in the rail members through the slider members, respectively. The nozzle portion is rotatably connected to the three or more arm members to inject a material and emit an energy beam. The drive mechanism includes at least five actuators that set one of a relative position and a relative angle between each (Continued)

of combinations of two mutually connected elements among the rail members, the slider members, the arm members, and the nozzle portion.

11 Claims, 14 Drawing Sheets

(51) Int. Cl.

| | | |
|---|---|---|
| B29C 67/00 | (2017.01) | |
| B29C 64/20 | (2017.01) | |
| B29C 64/153 | (2017.01) | |
| B22F 12/00 | (2021.01) | |
| B33Y 30/00 | (2015.01) | |
| B23K 26/144 | (2014.01) | |
| B23K 26/14 | (2014.01) | |
| B22F 3/00 | (2021.01) | |
| B23K 26/08 | (2014.01) | |
| B22F 10/10 | (2021.01) | |
| B29K 105/00 | (2006.01) | |

(52) U.S. Cl.
CPC ........ *B23K 26/0884* (2013.01); *B23K 26/144* (2015.10); *B23K 26/1462* (2015.10); *B29C 64/153* (2017.08); *B29C 64/20* (2017.08); *B29C 67/00* (2013.01); *B33Y 30/00* (2014.12); *B22F 10/10* (2021.01); *B29K 2105/251* (2013.01); *Y02P 10/25* (2015.11)

(58) Field of Classification Search
USPC .............................................. 219/76.1, 76.12
See application file for complete search history.

(56) References Cited

U.S. PATENT DOCUMENTS

| | | | | |
|---|---|---|---|---|
| 5,714,735 | A * | 2/1998 | Offer | B23K 9/1093 |
| | | | | 219/136 |
| 5,715,729 | A * | 2/1998 | Toyama | B23Q 1/5462 |
| | | | | 408/234 |
| 6,405,095 | B1 | 6/2002 | Jang et al. | |
| 7,572,403 | B2 * | 8/2009 | Gu | B29C 41/36 |
| | | | | 264/308 |
| 8,099,188 | B2 * | 1/2012 | Brogardh | B23Q 1/5462 |
| | | | | 700/245 |
| 8,714,903 | B2 * | 5/2014 | Feng | B25J 9/0051 |
| | | | | 414/729 |
| 9,149,870 | B2 * | 10/2015 | Minick | B22F 3/1055 |
| 9,656,423 | B2 * | 5/2017 | Hartmann | B29C 31/02 |
| 9,884,318 | B2 * | 2/2018 | Tow | G01N 35/1011 |
| 10,059,058 | B2 * | 8/2018 | Hartmann | B22F 3/003 |
| 10,071,478 | B2 * | 9/2018 | Houston | B25J 9/0009 |
| 10,173,374 | B2 * | 1/2019 | Ogawa | B33Y 30/00 |
| 2003/0005786 | A1 * | 1/2003 | Stuart | B23Q 1/5462 |
| | | | | 74/479.01 |
| 2006/0165546 | A1 | 7/2006 | Yamada et al. | |
| 2014/0175708 | A1 | 6/2014 | Echigo et al. | |
| 2015/0041025 | A1 * | 2/2015 | Wescott | B23K 9/042 |
| | | | | 148/538 |

FOREIGN PATENT DOCUMENTS

| | | |
|---|---|---|
| JP | 2002-18967 A | 1/2002 |
| JP | 2005-536703 A | 12/2005 |
| JP | 2006-200030 A | 8/2006 |
| JP | 2010-52331 A | 3/2010 |
| JP | 2013-67121 A | 4/2013 |
| JP | 2014-125643 A | 7/2014 |
| WO | 2003/004223 A2 | 1/2003 |

* cited by examiner

NOZZLE DEVICE AND ADDITIVE MANUFACTURING APPARATUS

CROSS-REFERENCE TO RELATED APPLICATIONS

This application is national stage application of International Application No. PCT/JP2015/055079, filed Feb. 23, 2015, which designates the United States, incorporated herein by reference, and which claims the benefit of priority from Japanese Patent Application No. 2014-187981, filed Sep. 16, 2014, the entire contents of which are incorporated herein by reference.

FIELD

Embodiments described herein relate generally to a nozzle device and an additive manufacturing apparatus.

BACKGROUND

Conventionally, an additive manufacturing apparatus for manufacturing an object by adding layers has been known. The additive manufacturing apparatus forms a material layer by feeding a powder material and emitting a laser beam from a nozzle to melt the powder, and adds layer upon layer of the material to manufacture an object. A known additive manufacturing apparatus of this kind includes a movable stage on which a manufactured object is mounted.

For this kind of additive manufacturing apparatus, it is significant to attain a nozzle device and an additive manufacturing apparatus with a novel nozzle-moving structure, for example. In particular, it is desirable to realize a nozzle drive mechanism with a simple structure and good mobility.

DETAILED DESCRIPTION

According to an embodiment, a nozzle device for an additive manufacturing apparatus comprises three or more rail members, three or more slider members, three or more arm members, a nozzle portion, and a drive mechanism. The three or more rail members each includes rails parallel with each other. The three or more slider members are connected to the rail members to be movable along the rails, respectively. The three or more members are connected to the slider members, and movably and rotatably supported in the rail members through the slider members, respectively. The nozzle portion is rotatably connected to the three or more arm members to inject a material and emit an energy beam. The drive mechanism includes at least five actuators that set one of a relative position and a relative angle between each of combinations of two mutually connected elements among the rail members, the slider members, the arm members, and the nozzle portion.

An embodiment and modifications will be described in detail below with reference to the accompanying drawings. The following embodiment and modifications include same or like elements. In the following, those same or like elements are denoted by common reference signs, and repeated description thereof will be omitted.

Embodiment

Figure 1:
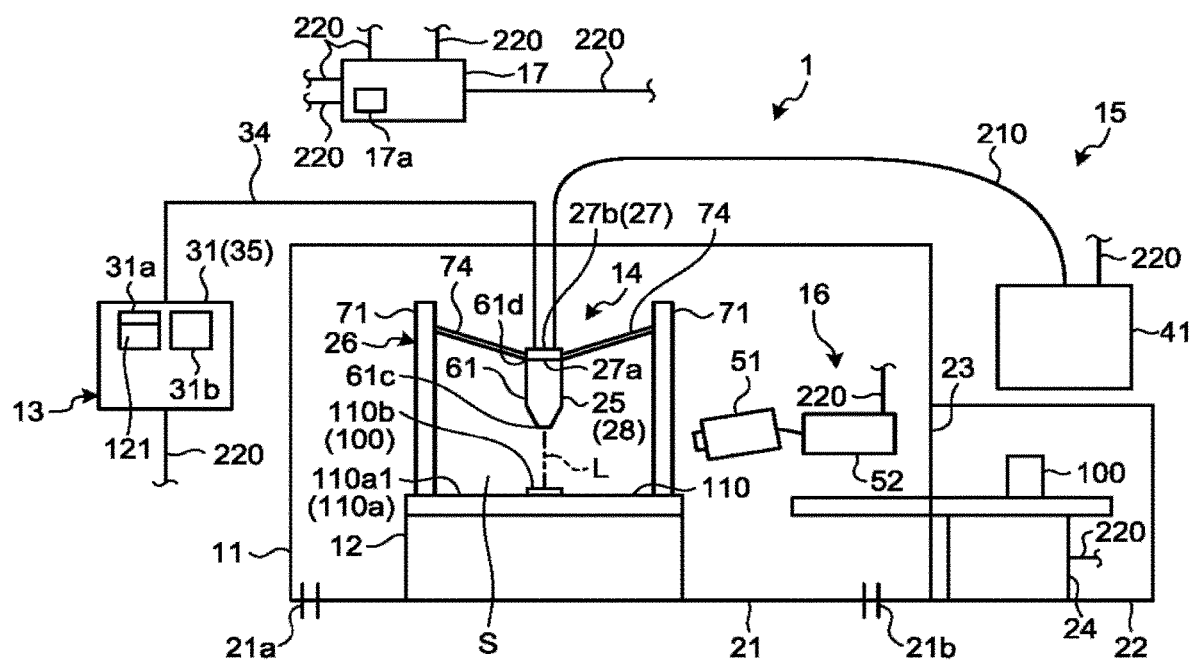
FIG. 1 is an exemplary schematic view of an additive manufacturing apparatus according to an embodiment.

As illustrated in FIG. 1, an additive manufacturing apparatus 1 includes a treatment tank 11, a platform 12 (stage), a material feed device 13 (modeling material-feed device), a nozzle device 14, an optical device 15, a measuring device 16, and a control device 17.

The additive manufacturing apparatus 1 adds a layer upon a layer of a material 121 (modeling material) fed from the nozzle device 14 on an object 110 disposed on the platform 12, to manufacture an object 100 (additive manufactured object) of a predetermined shape.

The object 110 is a target to which the material 121 is fed through the nozzle device 14, and includes a base 110a and a layer 110b. Layers 110b are laminated on a face 110a1 of the base 110a. The material 121 includes a powdered metal or resin material, for example. Alternatively, the material 121 may be a linear material instead of the powdered material. For additive manufacturing, one or more materials 121 can be used.

The treatment tank 11 includes a chamber 21 and a sub-chamber 22. The sub-chamber 22 is provided adjacent to the chamber 21. Between the main chamber 21 and the sub-chamber 22, a door 23 is provided. With the door 23 opened, the main chamber 21 and the sub-chamber 22 communicate with each other, and with the door 23 closed, the main chamber 21 is air-tightly sealed.

The main chamber 21 is provided with an air inlet 21a and an air outlet 21b. An air supplying device (not illustrated) supplies an inert gas such as nitrogen or argon into the main chamber 21 through the air inlet 21a. An air exhausting device (not illustrated) exhausts a gas from the main chamber 21 through the air outlet 21b.

The main chamber 21 further includes a transfer device (not illustrated). A conveying device 24 is also provided extending from the main chamber 21 to the sub-chamber 22. The transfer device transfers the manufactured object 100 treated in the main chamber 21 to the conveying device 24. The conveying device 24 receives the manufactured object 100 from the transfer device, and conveys it into the sub-chamber 22. That is, the sub-chamber 22 stores the manufactured object 100 treated in the main chamber 21. After the manufactured object 100 is stored in the sub-chamber 22, the door 23 is closed to isolate the sub-chamber 22 and the main chamber 21 from each other.

The main chamber 21 includes the platform 12, the nozzle device 14, and the measuring device 16. The platform 12 supports the base 110a.

The nozzle device 14 includes a nozzle 25 and a moving device 26. The moving device 26 moves the nozzle 25. The nozzle 25 feeds (jets) the powder (or linear) material 121 to the object 110 positioned on the platform 12. The nozzle 25 also emits a laser beam L to the object 110 positioned on the platform 12. The nozzle 25 emits the laser beam L while feeding the material 121.

The material feed device 13 includes a feed device 31 and a hollow feed tube 34 (tube). The material 121 is fed from the feed device 31 to the nozzle 25 through the feed tube (hollow) 34. The feed tube 34 is flexible and deformable.

The feed device 31 has a tank 31a and a feeder 31b. The tank 31a stores the material 121. The feeder 31b feeds a predetermined amount of the material 121 from the tank 31a to the nozzle 25. In case of using the powder material 121, the feeder 31b feeds a carrier gas (gas) containing the material 121 to the nozzle 25. The carrier gas is for example an inert gas, such as nitrogen or argon.

The optical device 15 includes a light source 41 and a cable 210. The light source 41 includes an oscillator (not illustrated), and emits the laser beam L by oscillation of the oscillator. The light source 41 can change a power density (intensity) of the laser beam L to be emitted. The cable 210 is for example an optical fiber.

The light source 41 is connected to the nozzle 25 through the cable 210. The light source 41 generates the laser beam L. The laser beam L emitted from the light source 41 is guided (fed) to the nozzle 25 through the cable 210. The nozzle 25 emits the laser beam L to the object 110 or jets the material 121 to the object 110. In the present embodiment, for an energy beam, the laser beam L (light beam) is used. The energy beam may be for example an electron beam or an electromagnetic wave ranging from microwaves to ultraviolet as long as it melts or sinters the material 121 as with the laser beam L. The light source 41 is an example of an energy beam source.

The measuring device 16 measures a shape of a solidified layer 110b and a shape of a manufactured object 100. The measuring device 16 transmits information about the measured shape to the control device 17. The measuring device 16 includes for example a camera 51 and an image processor 52. The image processor 52 performs image processing on the basis of information about measurement with the camera 51. The measuring device 16 measures the shapes of the layer 110b and the manufactured object 100, for example, by an interference method or a light section method.

The control device 17 is electrically connected to the conveying device 24, the moving device 26, the feed device 31, the light source 41, and the image processor 52 through a signal line 220.

The control device 17 controls the conveying device 24 to convey the manufactured object 100 to the sub-chamber 22. The control device 17 controls the feed device 31 to feed or not to feed the material 121, and adjust a feed amount of the material 121. The control device 17 controls the light source 41 to adjust the power density of the laser beam L emitted from the light source 41. The control device 17 controls the moving device 26 to move the nozzle 25.

The control device 17 includes a storage 17a. The storage 17a stores data representing a shape (reference shape) of the object 100 to be manufactured.

The control device 17 functions to determine the shape of the layer 110b or the manufactured object 100. For example, the control device 17 compares the shape of the layer 110b or the manufactured object 100 obtained by the measuring device 16, with the reference shape stored in the storage 17a to determine whether there is an area of unintended shape (unintended area).

The control device 17 further functions to trim the layer 110b or the manufactured object 100 into the predetermined shape by removing the area of unintended shape as determined by the shape determination. For example, the control device 17 controls the light source 41 to emit the laser beam L with a power density sufficient to vaporize the material 121 of the area of the unintended shape in the layer 110b or the manufactured object 100. Then, the control device 17 emits the laser beam L to the area to vaporize the area.

Figure 2:
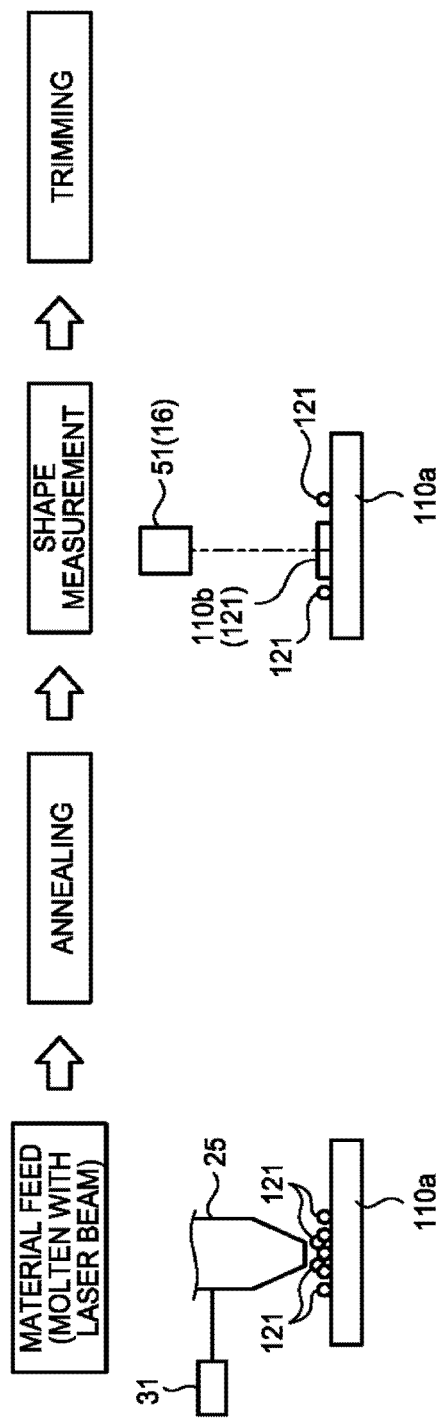
FIG. 2 is an explanatory view illustrating an exemplary manufacturing process of an object by an additive manufacturing apparatus according to the embodiment.

Next, a method of manufacturing the object 100 by the additive manufacturing apparatus 1 will be described with reference to FIG. 2. As illustrated in FIG. 2, first, the material 121 is fed and the laser beam L is emitted. The control device 17 controls the feed device 31 to feed the material 121 from the nozzle 25 to a predetermined area, and controls the light source 41 to melt the fed material 121 with the laser beam L. Thereby, as illustrated in FIG. 2, a predetermined amount of the molten material 121 is fed to the area on the base 110a in which the layer 110b is formed. The material 121 is jetted and deformed on the base 110a or the layer 110b and forms a mass of the material 121, such as a layer or a thin film. Alternatively, the material 121 is cooled by the carrier gas carrying the material 121, or by heat transfer to the mass of the material 121, and forms a layer of granules and a mass of granules.

Next, annealing is performed. An annealing apparatus (not illustrated) may be provided for the annealing outside the additive manufacturing apparatus 1 or the additive manufacturing apparatus 1 may perform annealing internally. In case of the latter, the control device 17 controls the light source 41 to emit the laser beam L to the mass of the material 121 on the base 110a. Thereby, the mass of the material 121 is melted again into the layer 110b.

Next, shape measurement is performed. The control device 17 controls the measuring device 16 to measure the annealed material 121 on the base 110a. The control device 17 compares the shape of the layer 110b or the manufactured object 100 obtained by the measuring device 16, with the reference shape stored in the storage 17a.

Next, trimming is performed. A trimming device (not illustrated) may be provided for the trimming outside the additive manufacturing apparatus 1, or the additive manufacturing apparatus 1 may perform trimming internally. In case of the latter, when determining from the shape measurement and the comparison with the reference shape that the material 121 is deposited on the base 110a outside the intended shape, for example, the control device 17 controls the light source 41 to vaporize the deposited material 121. In contrast, when determining from the shape measurement and the comparison with the reference shape that the layer 110b has the intended shape, the control device 17 does not perform trimming.

After the formation of the layer 110b, the additive manufacturing apparatus 1 forms a new layer 110b on the formed layer 110b. The additive manufacturing apparatus 1 repeatedly adds the layers 110b and manufactures the object 100.

Figure 3:
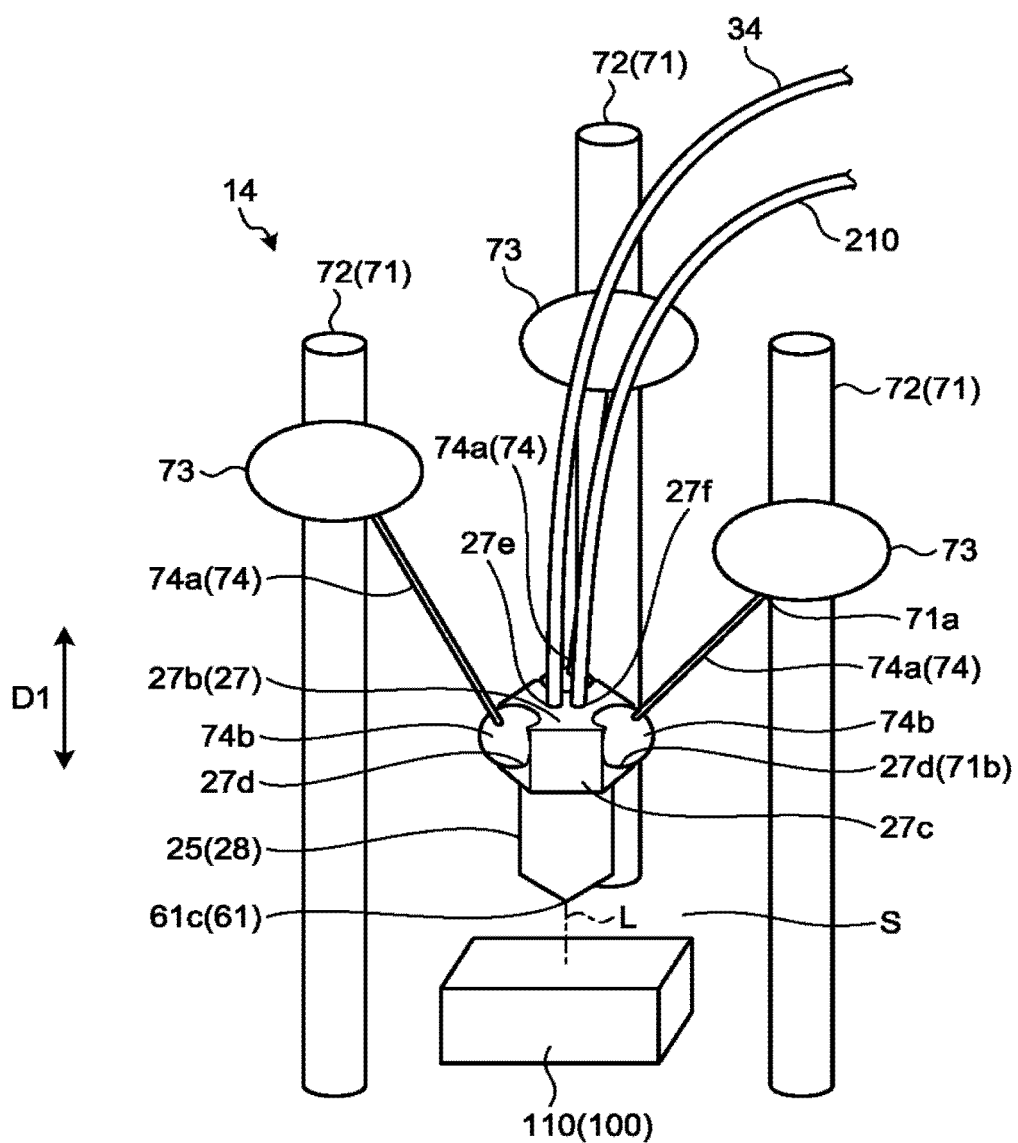
FIG. 3 is an exemplary schematic diagram of part of a nozzle device according to the embodiment.

Next, the nozzle device 14 will be described in detail. As illustrated in FIGS. 1 and 3, the nozzle 25 of the nozzle device 14 has a body 61. The body 61 has a tubular shape extending along an axis Ax1 (see FIG. 4). The body 61 has ends 61c and 61d (FIG. 1) along the axis Ax1. The nozzle 25 jets the powder (or linear) material 121 and emits the laser beam L from the end 61c. The end 61d is opposite to the end 61c.

Figure 4:
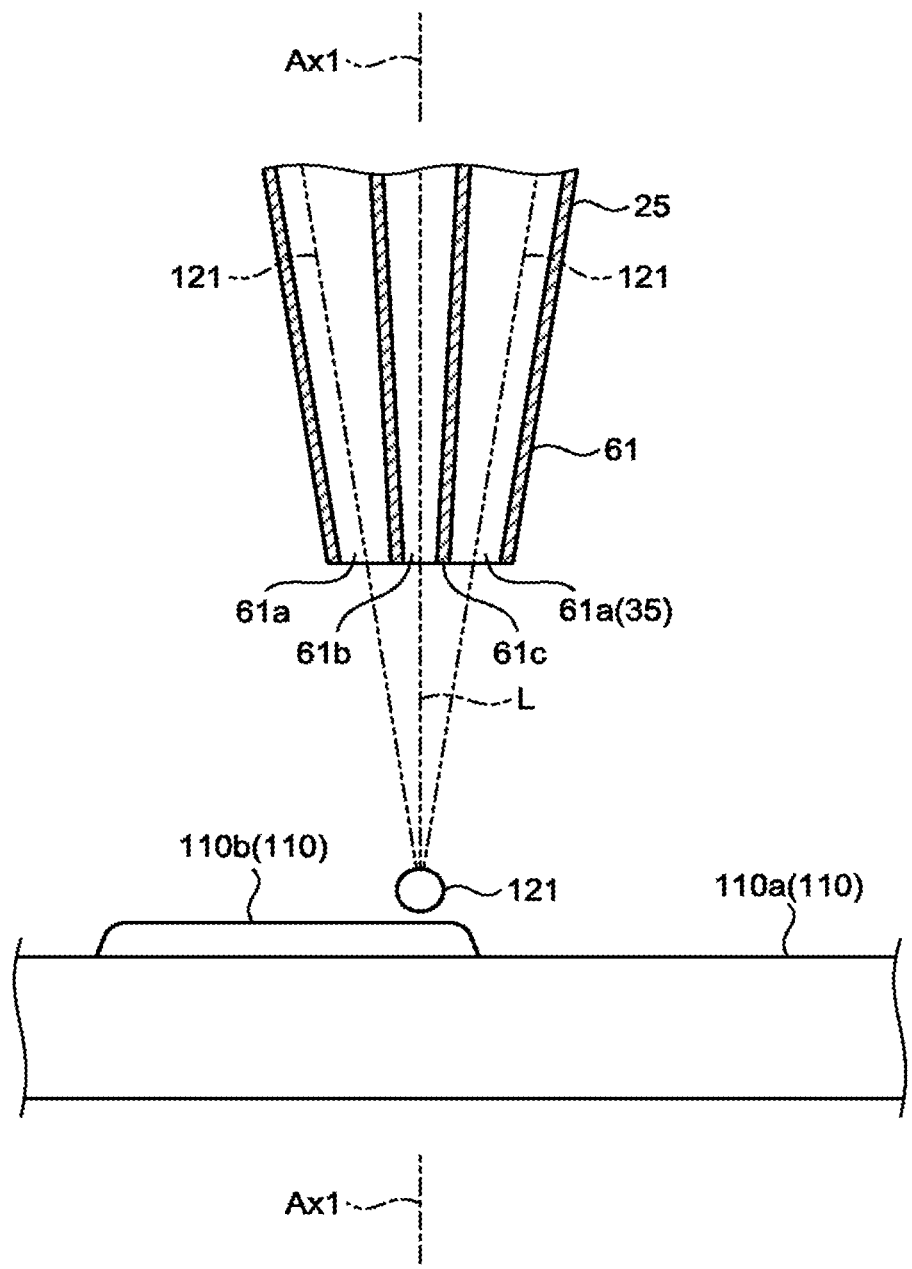
FIG. 4 is an exemplary schematic cross-sectional view of part of a nozzle according to the embodiment.

As illustrated in FIG. 4, the body 61 is provided with passages 61a and 61b. The passages 61a and 61b extend from the end 61d (FIG. 1) to the end 61c. The axis Ax1 of the body 61 passes on the passage 61b. The laser beam L is introduced into the passage 61b from the optical device 15. In the middle of the passage 61b, an optical system is disposed which includes a conversion lens for converting the laser beam L to parallel beam, and a condensing lens for focusing the parallel laser beam L. The laser beam L is focused on a focal position outside the body 61 by the condensing lens. The focal position (focal point) of the laser beam L is located on the axis Ax1.

One or more passages 61a are positioned radially outside the passage 61b. Each passage 61a is connected to the feed device 31 through the feed tube 34. In case of using the powder material 121, the material 121 is fed to each passage 61a from the feed device 31, together with the carrier gas. Part of the passage 61a closer to the end 61c is inclined with respect to the axis Ax1 of the body 61 as approaching the axis Ax1 toward the end 61c.

In case of using the powder material 121, the nozzle 25 jets (injects) the material 121 together with the carrier gas from an outlet (opening) of the passage 61a to outside the body 61 (passage 61a). Alternatively, in case of using a linear material 121, the nozzle 25 extrudes (injects) the material 121 from the outlet of the passage 61a to outside the body 61. The jetted or extruded material 121 reaches the focal position of the laser beam L. The material 121 fed by the nozzle 25 is melted by the laser beam L to form a mass of the molten material 121. The molten material 121 is cooled, for example, by the carrier gas carrying the material 121. Herein, the passage 61a partially constitutes a cooler 35 that cools the material 121 irradiated with the laser beam L. The cooler 35 includes the feed device 31 that feeds the carrier gas.

Figure 5:
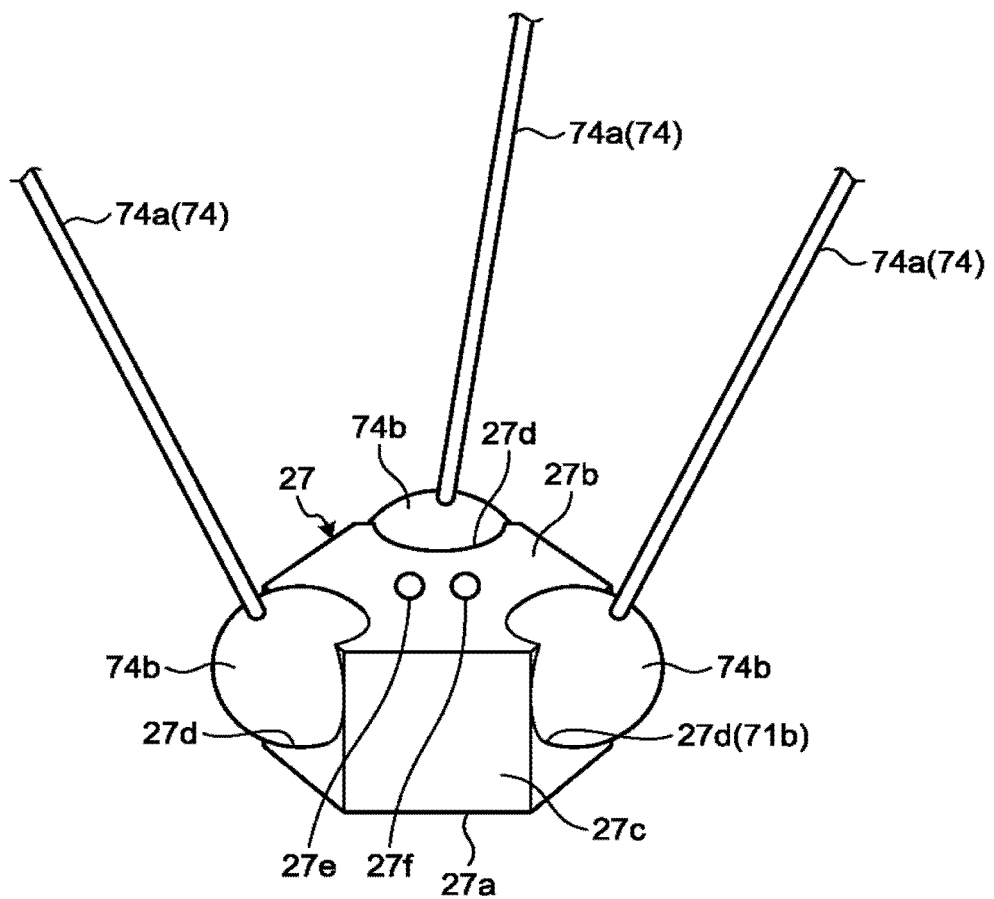
FIG. 5 is an exemplary schematic perspective view of a coupling structure for coupling a nozzle portion and an arm member according to the embodiment.

As illustrated in FIG. 3, the nozzle 25 includes a coupling member 27. The coupling member 27 is a member for coupling the nozzle 25 and arm members 74 of the moving device 26. The coupling member 27 is connected (fixed) to the end 61d. As illustrated in FIG. 5, the coupling member 27 has faces 27a, 27b, and 27c. The face 27a (end face) faces the end 61d. The face 27b (end face) is opposite to the face 27a. The face 27c (spanning face) extend between the face 27a and the face 27b. Furthermore, the coupling member 27 includes three ball receivers 27d (couplings). The three ball receivers 27d are spaced at substantially equal angular intervals of 120° about the axis Ax1. Each of the ball receivers 27d (receiving face) has a recessed shape extending from the face 27b to the face 27c. These ball receivers 27d each rotatably contain a ball 74b of the arm member 74. The ball receiver 27d and the ball 74b form a ball joint (coupler, coupling structure). That is, the ball 74b and the ball receiver 27d are configured to be three-dimensionally rotatable relative to each other (rotatable in an arbitrary direction). The coupling member 27 is further provided with holes 27e and 27f. The holes 27e and 27f extend between the faces 27a and 27b. The feed tube 34 is inserted into the hole 27e, and the material 121 is fed from the feed tube 34 to the passage 61a. In addition, the cable 210 is inserted into the hole 27f, and the laser beam L is introduced from the cable 210 into the body 61. The coupling member 27 and the nozzle 25 form a nozzle portion 28.

As illustrated in FIG. 3, the moving device 26 includes three support mechanisms 71. The three support mechanisms 71 are placed on the base 110a (see FIG. 1). The moving device 26 supports the nozzle portion 28 at three positions with the three support mechanisms 71. The three support mechanisms 71 can change a position and a posture of the nozzle portion 28 at least in a manufacturing area S (space) on the face 110a1 of the base 110a, in which the object 100 is manufactured. Thus, the three support mechanisms 71 include the same components. This can simplify the structure of the moving device 26 and achieve cost reduction.

Figure 6:
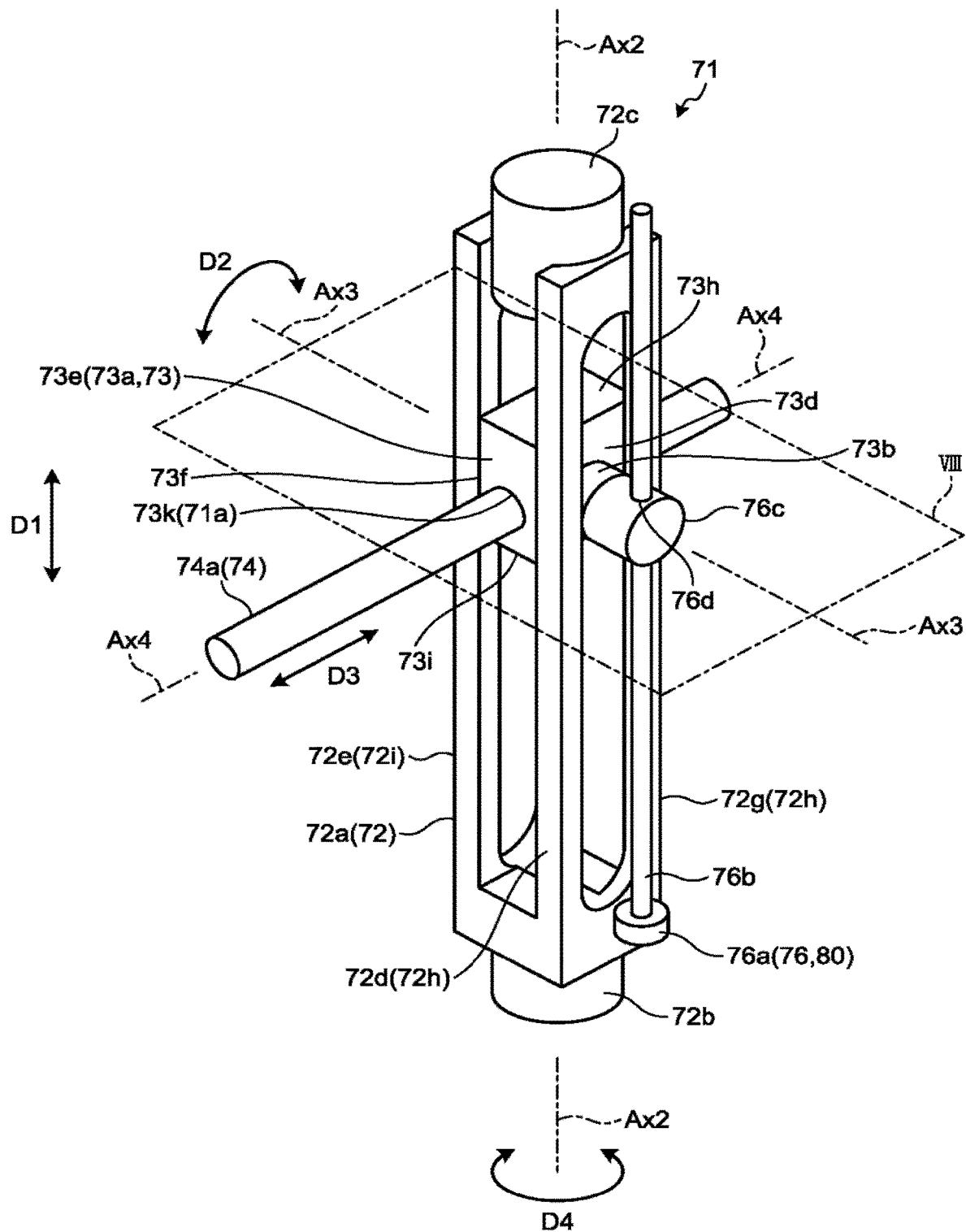
FIG. 6 is an exemplary schematic perspective view of part of a support mechanism according to the embodiment.
Figure 7:
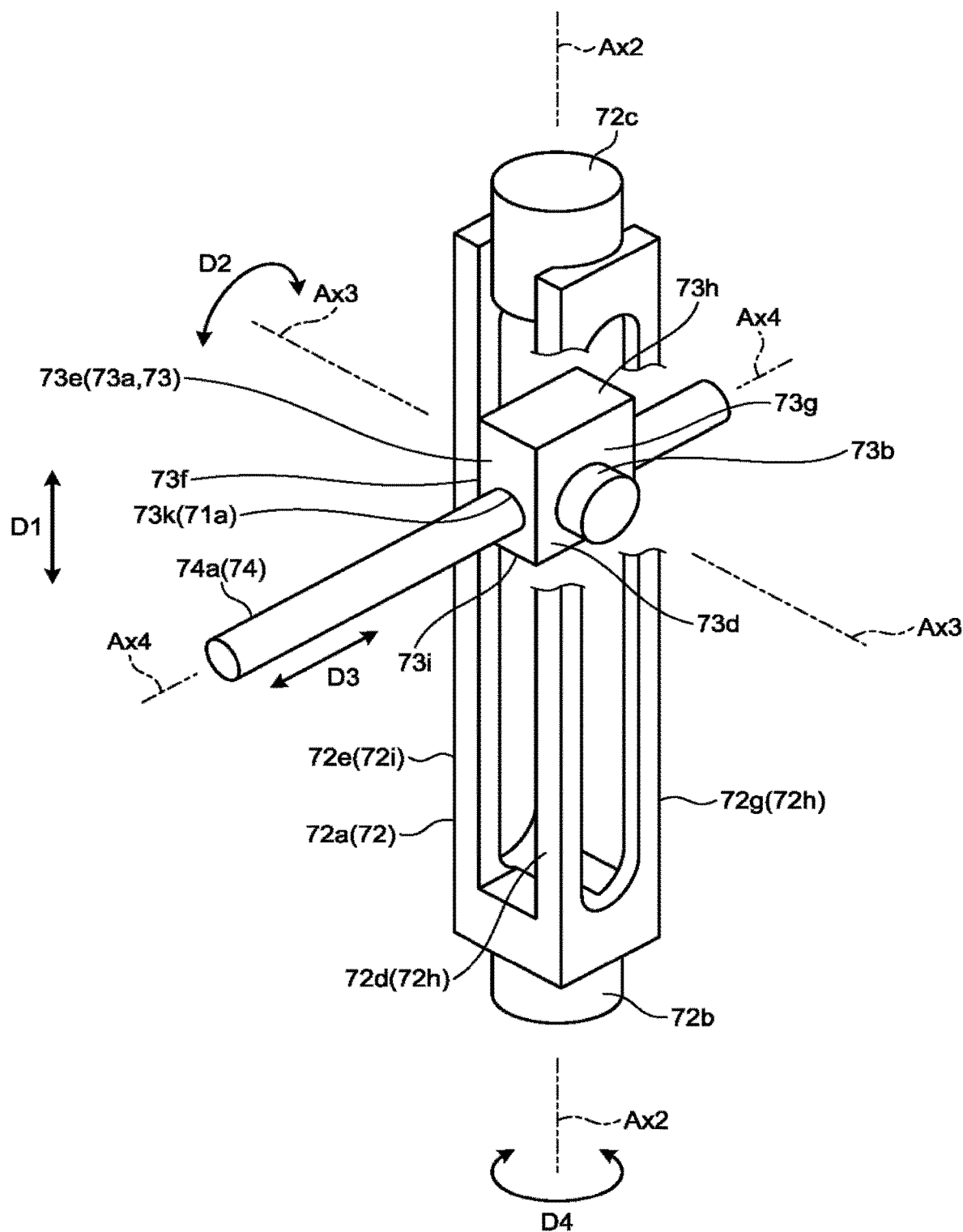
FIG. 7 is an exemplary schematic perspective view of the support mechanism according to the embodiment.

As illustrated in FIGS. 6 and 7, each support mechanism 71 includes a rail member 72, a slider member 73, and the arm member 74. That is, the moving device 26 includes three rail members 72, three slider members 73, and three arm members 74. The rail members 72 are supported on the base 110a, the slider members 73 are supported in the rail members 72, and the arm members 74 are supported by the slider members 73. The arm members 74 support the nozzle portion 28.

The three rail members 72 are placed on the base 110a, projecting from the face 110a1 of the base 110a (see FIG. 1). As illustrated in FIG. 3, the three rail members 72 are positioned to surround the object 100 while jetted with the material 121 and irradiated with the laser beam L during manufacturing. The rail members 72 are rotatably supported along the rails 72d to 72g on the base 110a about a rotation center Ax2 (direction D4).

Each rail member 72 has a columnar shape (rod shape) as a whole in a direction D1. The direction D1 may be a vertical direction or a direction orthogonal to the vertical direction. The rail member 72 has a body 72a and shafts 72b and 72c. The body 72a extends in the direction D1, and the shafts 72b and 72c are provided at both ends of the body 72a in the direction D1.

Figure 8:
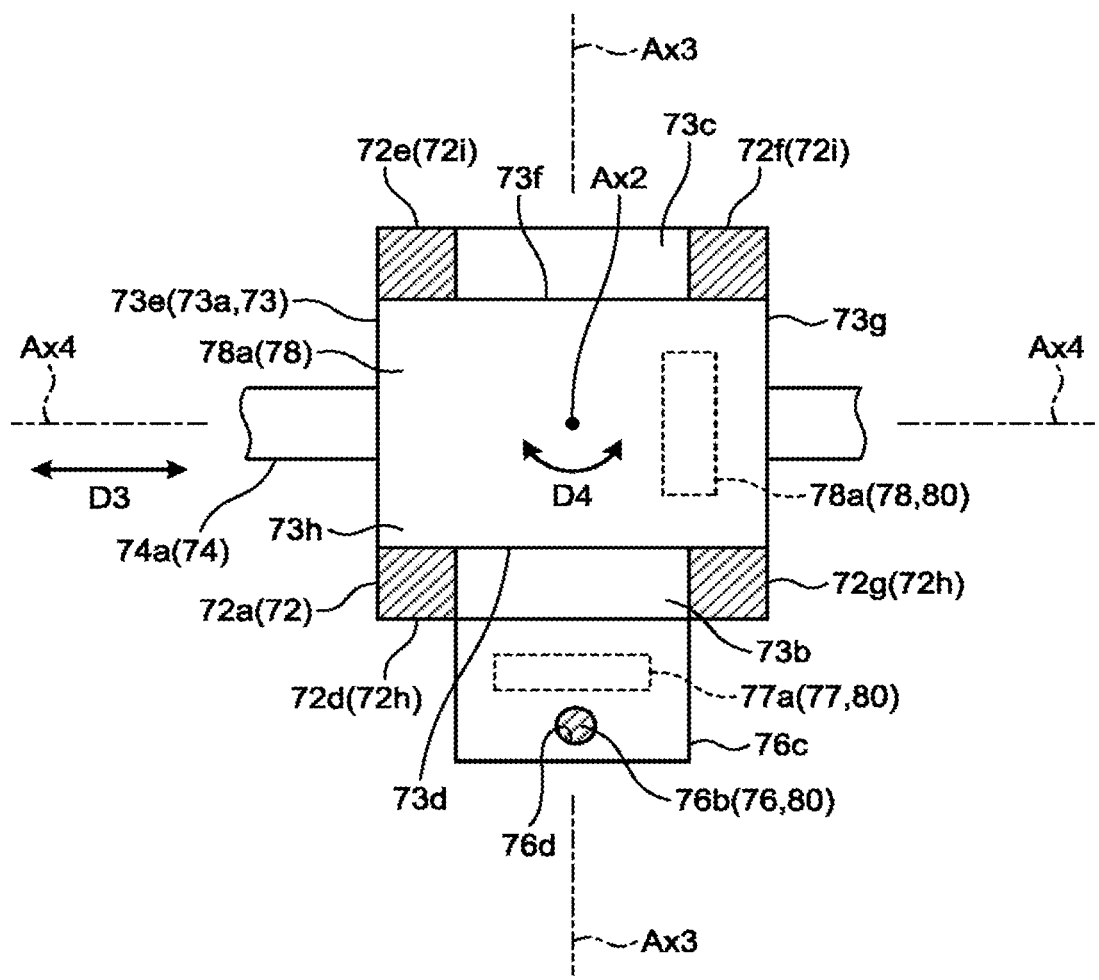
FIG. 8 is a cross-sectional view of a VIII area of FIG. 6.

As illustrated in FIGS. 6 to 8, the body 72a includes four rails 72d to 72g. The four rails 72d to 72g extend in the direction D1 in substantially parallel with each other. The four rails 72d to 72g are spaced apart from each other about the rotation center Ax2. The rail 72d and the rail 72g are a rail pair 72h (first rail pair), and the rail 72e and the rail 72f are another rail pair 72i (second rail pair).

Figure 9:
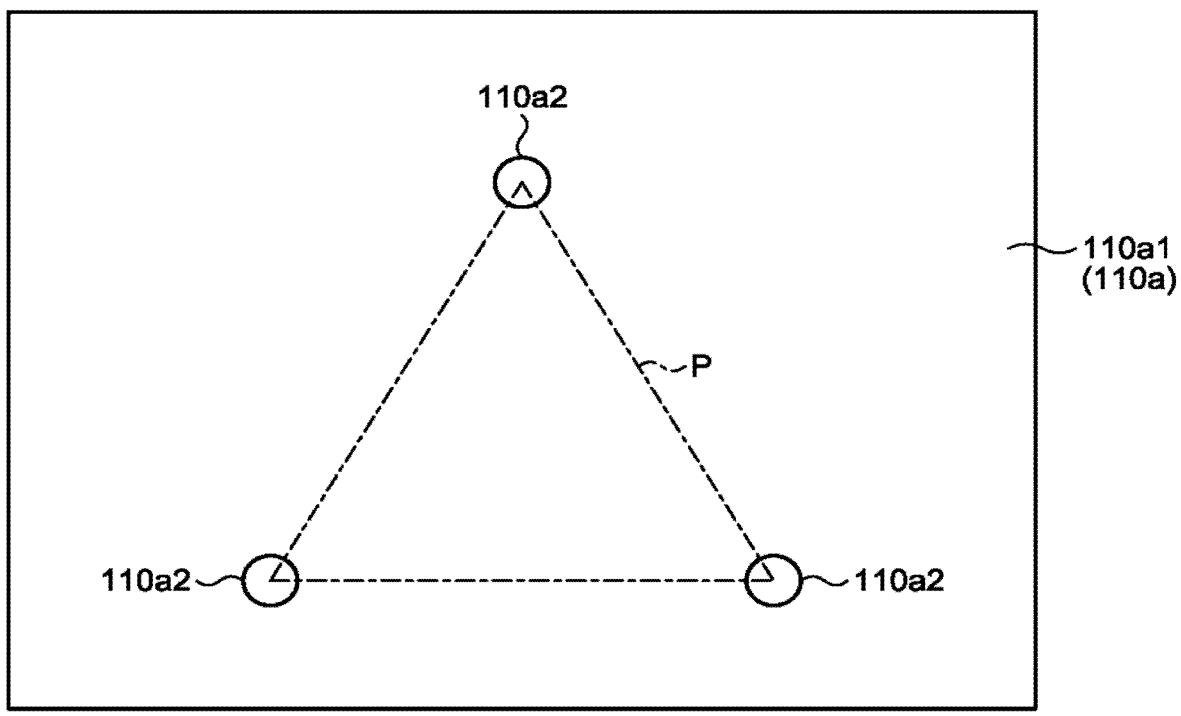
FIG. 9 is an exemplary schematic plan view of a base according to the embodiment.

The shaft 72b is provided at one end of the body 72a closer to the base 110a, and the shaft 72c is provided at the other end of the body 72a. The shafts 72b and 72c have a columnar shape about the rotation center Ax2 (hereinafter, the rotation center represents a rotation axis). The shaft 72b is rotatably supported at a support 110a2 of the base 110a about the rotation center Ax2. As illustrated in FIG. 9, on the face 110a1 of the base 110a, the three supports 110a2 are positioned at vertices of a virtual triangle P, when viewed along the rotation center Ax2 (direction D1). The shaft 72c may also be rotatably supported by a not-illustrated support.

As illustrated in FIGS. 6 to 8, each slider member 73 is connected (supported) to the rail member 72 to be movable along the rails 72d to 72g (direction D1), and is rotatably connected (supported) to the rail member 72 about a rotation center Ax3 crossing (e.g., orthogonal to) the rotation center Ax2. The slider member 73 includes a casing 73a and shafts 73b and 73c.

The casing 73a is positioned between the rail pair 72h and the rail pair 72i. The casing 73a has a substantially cuboid shape (hexahedron shape). The casing 73a has faces 73d to 73i. The face 73d faces the rail pair 72h, and the face 73f faces the rail pair 72i. The face 73e is exposed from a space between the rail 72d and the rail 72e, and the face 73g is exposed from a space between the rail 72f and the rail 72g. The casing 73a includes a ball screw nut 73k (screw member). The ball screw nut 73k is opened to the face 73e. The ball screw nut 73k is fixed to the casing 73a.

The shaft 73b projects from the face 73d along the rotation center Ax3, and the shaft 73c projects from the face 73f along the rotation center Ax3. The shafts 73b and 73c have a columnar shape about the rotation center Ax3. The shaft 73b is positioned between the rail 72d and the rail 72g, and the shaft 73c is positioned between the rail 72e and the rail 72f. The shaft 73b is connected to the rail 72d and the rail 72g to be movable along the rails 72d and 72g, and rotatable about the rotation center Ax3. The shaft 73c is connected to the rail 72e and the rail 72f to be movable along the rails 72e and 72f and rotatable about the rotation center Ax3.

The slider member 73 is moved along the rails 72d to 72g by a driver 76 (FIGS. 6 and 8). As illustrated in FIGS. 6 and 8, the driver 76 includes a motor 76a, a ball screw shaft 76b, a casing 76c, and a ball screw nut 76d.

The ball screw shaft 76b (screw member) extends along the rails 72d to 72g (direction D1). The casing 76c has a cylindrical shape with both ends closed. The casing 76c includes the ball screw nut 76d (screw member). The ball screw nut 76d is meshed with the ball screw shaft 76b through balls (not illustrated). The casing 76c accommodates a motor 77a (FIG. 8). The casing 76c is coupled to the shaft 73b through the motor 77a. The ball screw shaft 76b and the ball screw nut 76d constitute the ball screw. The motor 76a includes a rotation shaft connected to the ball screw shaft 76b. The motor 76a is for example a stepping motor.

When the motor 76a rotates the ball screw shaft 76b, the ball screw shaft 76b and the ball screw nut 76d convert the rotation of the ball screw shaft 76b to linear movement of the casing 76c, to move the slider member 73 together with the casing 76c in the direction D1. By rotation of the rotation shaft of the motor 76a in one direction (forward rotation), the slider member 73 is moved together with the casing 76c in one direction D1 (e.g., upward in FIGS. 1 and 5). By the rotation of the rotation shaft of the motor 76a in the opposite direction (reverse rotation), the slider member 73 is moved together with the casing 76c in the opposite direction D1 (e.g., downward in FIGS. 1 and 5). While the rotation shaft stops rotating, the motor 76a holds (locks) the positions of the casing 76c and the slider member 73 (positions in the direction D1). That is, the motor 76a can set a relative position between the rail member 72 and the slider member 73 (positions in the direction D1). The motor 76a is an example of a first actuator.

The slider member 73 is rotated about the rotation center Ax3 by a driver 77. As illustrated in FIG. 8, the driver 77 includes the motor 77a. The motor 77a is for example a stepping motor. The motor 77a is housed and supported in the casing 76c. The motor 77a includes a rotation shaft connected to the shaft 73b. Along with the rotation shaft of the motor 77a in one direction (forward rotation), the slider member 73 is rotated about the rotation center Ax3 in one direction D2. Along with the rotation of the rotation shaft of the motor 77a in the opposite direction (reverse rotation), the slider member 73 is rotated about the rotation center Ax3 in the opposite direction D2 (reverse direction). While the rotation shaft stops rotating, the motor 77a maintains (locks) the angle of the slider member 73 (arm member 74) relative to the rail member 72. The driver 77 may be configured to include a power transmission mechanism (not illustrated) interposed between the motor 77a and the shaft 73b.

The arm member 74 is movably connected to the slider member 73 along an axis Ax4 (rotation center, rotation axis) of the arm member. A direction D3 of the axis Ax4 crosses the direction D1 along the rotation center Ax2 and a direction along the rotation center Ax3. As illustrated in FIGS. 3, 5, and 6, the arm member 74 includes a ball screw shaft 74a and the ball 74b. The ball screw shaft 74a (screw member) penetrates the casing 73a (faces 73e and 73g) while meshing with the ball screw nut 73k of the slider member 73 through balls (not illustrated). The ball screw shaft 74a is movably connected to the ball screw nut 73k in the axial direction D3. The ball screw shaft 74a and the ball screw nut 73k constitute a ball screw.

As illustrated in FIGS. 3 and 5, the ball 74b (coupling) is connected (fixed) to one end of the ball screw shaft 74a. The ball 74b is coupled to the ball receiver 27d of the coupling member 27. The arm member 74 supports the nozzle portion 28.

The arm member 74 is moved along the axis Ax4 by a driver 78. The driver 78 includes a motor 78a (FIG. 8) and a power transmission mechanism (not illustrated). The motor 78a is supported in the casing 73a. The motor 78a is for example a stepping motor. The motor 78a is connected to the ball screw shaft 74a through the power transmission mechanism. The power transmission mechanism can include a ball screw nut rotatable relative to the casing 73a of the slider member 73.

A drive force of the motor 78a rotates the ball screw shaft 74a relative to the ball screw nut 73k to move the ball screw shaft 74a along the axis Ax4. Along with the rotation of the motor 78a in one direction (forward rotation), the arm member 74 is moved in one axial direction D3 (e.g., leftward in FIG. 8). Along with the rotation of the motor 78a in the opposite direction (reverse rotation), the arm member 74 is moved in the opposite axial direction D3 (e.g., rightward in FIG. 8). While the rotation shaft stops rotating, the motor 78a holds (locks) the position of the arm member 74 relative to the slider member 73. In the above configuration, a distance (distance in axial direction D3) between a connection 71a (see FIGS. 3 and 6) between the arm member 74 and the slider member 73, and a connection 71b (see FIGS. 3 and 5) between the arm member 74 and the nozzle portion 28 can be changed. The motor 78a can set a relative position between the connection 71a and the connection 71b. The connection 71a is an example of a first connection, the connection 71b is an example of a second connection, and the motor 78a is an example of a third actuator.

The arm member 74 is moved together with the slider member 73 along the rails 72d to 72g by the driver 76. The arm member 74 is rotated together with the slider member 73 relative to the rail member 72 by the driver 77. That is, the arm member 74 is connected to the slider member 73, and is movably and rotatably supported in the rail member 72 through the slider member 73. The motor 77a of the driver 77 can set a relative angle (angles about the rotation center Ax3) between the rail member 72 and the arm member 74. The motor 77a is an example of a second actuator.

As can be seen from the above, the moving device 26 includes three drivers 76, three drivers 77, and three drivers 78. The three drivers 76, the three drivers 77, and the three drivers 78 constitute a drive mechanism 80 (see FIG. 6). Thus, the drive mechanism 80 includes three motors 76*a*, three motors 77*a*, and three motors 78*a*. The motors 76*a*, 77*a*, and 78*a* can set one of the relative position and the relative angle between two mutually connected elements (the rail member 72, the slider member 73, and the arm member 74). For example, each motor 76*a* can set the relative position between the rail member 72, and the slider member 73 and the arm member 74. Each motor 77*a* can set the relative angle between the rail member 72, and the slider member 73 and the arm member 74. Each motor 78*a* can set the relative position between the slider member 73 and the arm member 74. With a change in the relative position and relative angle among the respective members, the rail member 72 is rotated about the rotation center Ax2 by receiving a force from the arm member 74 through the slider member 73. By the above operation of the motors 76*a*, 77*a*, and 78*a*, the moving device 26 can change the position and posture of the nozzle portion 28.

Figure 10:
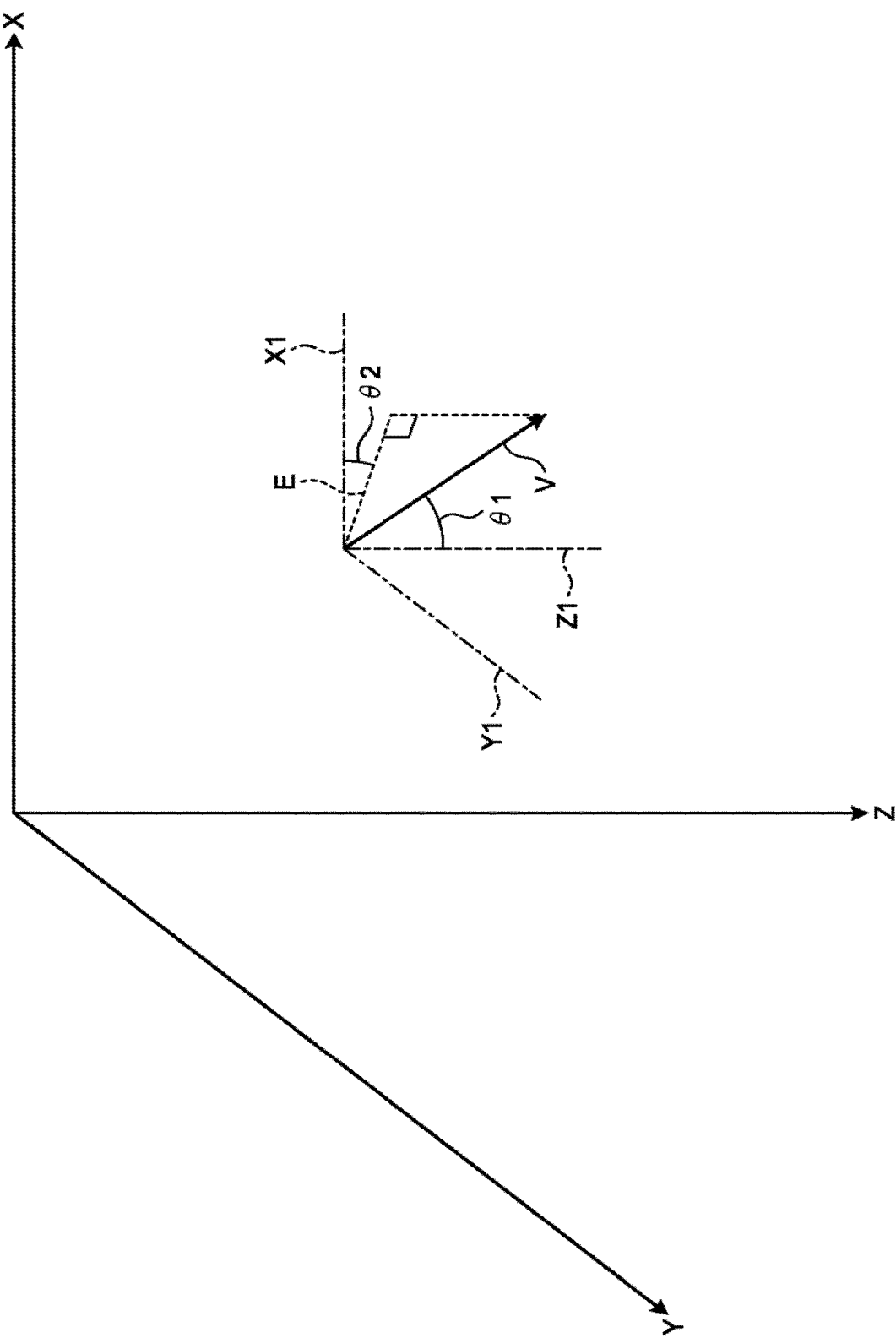
FIG. 10 is an explanatory view illustrating an example of a position and posture of the nozzle according to the embodiment.

The position and posture of the nozzle 25 in an X-Y-Z coordinate system will be now described with reference to FIG. 10. In FIG. 10, an end point of a vector V in the X-Y-Z coordinate system corresponds to a processing point (manufacturing point) of the nozzle 25, and a direction of the vector V corresponds to a direction of the axis Ax1 of the nozzle 25. Further, in FIG. 10, a line X1 passes starting point coordinates (x, y, z) of the vector V and is parallel with the X axis, a line Y1 passes the starting point coordinates (x, y, z) of the vector V and is parallel with the Y axis, and a line Z1 passes the starting point coordinates (x, y, z) of the vector V and is parallel with the Z axis. The angle between the line Z1 and the vector V is defined as θ1 and the angle between the line X1 and a mapping E (projection line) of the vector V to a plane including the line X1 and the line Y1 is defined as θ2. In this case, the position and posture of the vector V can be expressed by the starting point coordinates (x, y, z) of the vector V, the angle θ1, and the angle θ2. Thus, the position and posture of the nozzle 25 (nozzle portion 28) can be set when driven with five degrees of freedom. In the present embodiment, the rail member 72 is rotatable about the rotation center Ax2, the slider member 73 is movable in the direction D1 and rotatable about the rotation center Ax3, the arm member 74 is movable in the axial direction D3, and the arm member 74 and the nozzle portion 28 are rotatably connected, thereby achieving driving with the five degrees of freedom.

Figure 11:
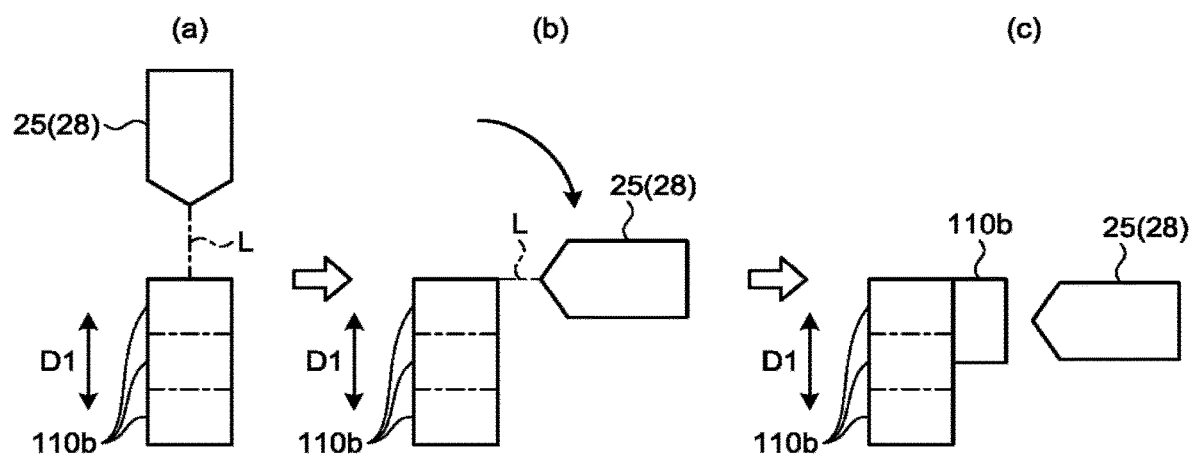
FIG. 11 is an explanatory view illustrating operation of the nozzle portion according to the embodiment.

An example of operation of such a nozzle device 14 for the manufacturing will be described with reference to FIG. 11. In case of adding the layers 110*b* in the direction D1 (FIG. 11(*a*)), the moving device 26 first moves the nozzle portion 28 to be placed in posture with the axis Ax1 oriented in the direction D1 and the end 61*c* facing toward the base 110*a*. Then, the moving device 26 moves the nozzle portion 28 to a different position, maintaining the posture, to emit the laser beam L and jet the material 121 therefrom. For adding a layer 110*b* on the side faces (faces parallel to the direction D1) of the thus-formed layers 110*b*, the moving device 26 places the nozzle portion 28 in a posture in which, for example, the axis Ax1 crosses (e.g., orthogonal to) the direction D1, and the end 61*c* faces toward the side faces (FIG. 11(*b*)). Next, while holding the posture of the nozzle portion 28, the moving device 26 moves the nozzle portion 28 to a different position to emit the laser beam L and jet the material 121 therefrom. Thereby, the layer 110*b* can be formed (forming of wall face) on the side faces (faces crossing the direction D1) of the layers 110*b* (FIG. 11(*c*)).

The moving device 26 can also change the position of the nozzle portion 28 while maintaining a constant distance between the connection 71*a* between each arm member 74 and the slider member 73, and the connection 71*b* between each arm member 74 and the nozzle portion 28. In this configuration, the slider member 73 is moved in the direction D1 and rotated about the rotation center Ax3, and the arm member 74 is rotated about the rotation center. In this case, the posture of the nozzle portion 28 is maintained constantly. While holding the position of the slider member 73 in the direction D1, the moving device 26 moves the arm members 74 in the axial direction D3 to move the nozzle portion 28 in the axial direction D3. The moving device 26 can also position the nozzle portion 28 opposite the base 110*a* in a space surrounded by the arm members 74.

The nozzle device 14 according to the present embodiment described above includes three or more (e.g., three) rail members 72, three or more (e.g., three) slider members 73, three or more (e.g., three) arm members 74, the nozzle portion 28, and the drive mechanism 80. The three or more rail members 72 each include the rails 72*d* to 72*g* substantially parallel with each other. The three or more slider members 73 are movably connected to the respective rail members 72 along the rails 72*d* to 72*g*. The three or more arm members 74 are connected to the respective slider members 73 and are movably and rotatably supported by the rail members 72 through the slider members 73, respectively. The nozzle portion 28 is rotatably connected to the three or more arm members 74 to jet the powder (or linear) material 121 and emit the laser beam L (energy beam). The drive mechanism 80 includes at least five motors 76*a*, 77*a*, and 78*a* (actuators) which set one of the relative position and the relative angle between each of combinations of two connected elements among the rail members 72, the slider members 73, and the arm members 74 as elements. Thus, the nozzle device 14 and the additive manufacturing apparatus 1 with a novel structure for moving the nozzle portion 28 (nozzle 25) can be attained. That is, the object 100 does not need to be moved relative to the nozzle portion 28 during manufacturing with the nozzle portion 28. Hence, for example, during manufacture with the nozzle portion 28, vibrations from the moving object 100 can be inhibited. Thereby, shape accuracy of the manufactured object 100 can be improved. In case of using a fixed nozzle and moving a stage or an object, a large-scale drive mechanism is required for moving a heavy load in a larger moving area on the stage. The object is increased in weight as manufacturing process progresses, reducing in mobility and causing decrease in manufacturing speed and manufacturing accuracy. In case of moving the nozzle by robotic arms, in view of a bending posture of each arm, the three-dimensional moving regions of the at is tend to fall outside the manufacturing area. In contrast, the drive mechanism 80 according to the present embodiment, for example, moves the arm members 74 or the nozzle portion 28 within a region approximate to the manufacturing area S. Thus, according to the present embodiment, the additive manufacturing apparatus can be further compact in structure, for example, than the one which moves the stage or the manufactured object, or the one including robotic arms for moving the nozzle. Further, the moving device 26 according to the present embodiment includes three supporting mechanisms 71 having a similar structure. This simplifies the whole structure of the moving device 26, leading to potential cost reduction. The light source 41 and the material feed device 13 are spaced apart from the nozzle 25. That is, the nozzle 25 does not need to directly include the light source 41 and the material feed device 13, and can be reduced in weight. Thereby, the nozzle 25 can improve its mobility, realizing improvement in the manufacturing speed and manufacturing accuracy.

The drive mechanism 80 includes the motors 76a (first actuator) that set a relative position between the rail members 72 and the slider members 73. Thus, the relative position between the rail members 72 and the slider members 73 can be decided with the motors 76a.

The drive mechanism 80 further includes the motors 77a (second actuator) that set the relative angle between the rail members 72 and the arm members 74. Thus, the relative angle between the rail members 72 and the arm members 74 can be decided with the motors 77a.

The rail members 72 are rotatably provided about the rotation center Ax2 in the extending direction of the rails 72d to 72g. Thus, the rail members 72, the slider members 73, and the arm members 74 are integrally rotatable about the rotation center Ax2.

The nozzle portion 28 can change the distance between the connections 71a (first connection) between the arm members 74 and the slider members 73, and the connections 71b (second connection) between the arm members 74 and the nozzle portion 28. The drive mechanism 80 includes the motors 78a (third actuator) that set the relative position between the connections 71a and the connections 71b. Thus, the relative position between the connections 71a and the connections 71b can be decided with the motors 78a.

The arm members 74 are movably connected to the slider members 73. Thus, the slider members 73 can be moved to move the connections 71b between the arm members 74 and the nozzle portion 28.

The nozzle portion 28 is provided with at least part (passage 61a) of the cooler 35 that cools the material 121 irradiated with the laser beam L. Thus, for example, during wall face manufacturing, the molten material 121 by irradiation with the laser beam L is solidified by cooling by the cooler 35, thereby making it possible to inhibit dripping of the material 121.

Further, without the light source 41 included, the nozzle portion 28 can be reduced in weight, which can decrease a load on the motors 76a, 77a, and 78a. Thereby, positioning accuracy of the nozzle portion 28 can be improved.

The nozzle portion 28 is separated from the object 100 during manufacturing. This prevents a reactive force (load) from the object 100 from acting on the moving device 26. Thus, the moving device 26 can be reduced in weight.

Further, the nozzle device 14 can be disassembled into the nozzle portion 28 and the three support mechanisms 71. Thus, the nozzle device 14 is easily transportable.

The nozzle device 14 is removable by removing the rail members 72 from the base 110a and removing the feed tube 34 and the cable 210 from the nozzle portion 28.

The three support mechanisms 71 have the same structure, thus the movement of the three support mechanisms 71 is easily controllable.

The three support mechanisms 71 are positioned at the respective vertices of the virtual triangle P, so that each of the support mechanisms 71 is relatively easily controllable.

Figure 12:
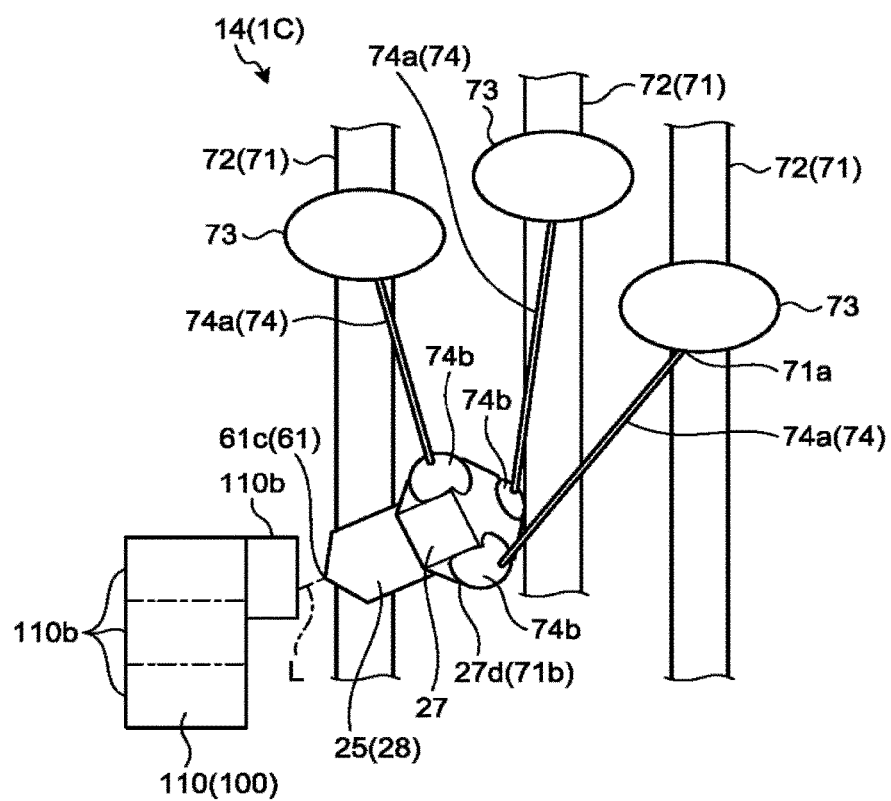
FIG. 12 is a schematic perspective view of another example of positions of installed rail members according to the embodiment.

The present embodiment has described the example in which the three rail members 72 are located to surround the object 100 during manufacturing, but the present invention is not limited thereto. As illustrated in FIG. 12, the three rail members 72 may be located not to surround the object 100 during manufacturing. Also, the additive manufacturing apparatus 1 can form an overhang to the object 100, jet or extrude the material 121 upward from below the overhang, and additively form the layers 110b on a bottom of the overhang.

First Modification

An additive manufacturing apparatus 1A according to the present modification has a configuration similar to that of the additive manufacturing apparatus 1. However, the additive manufacturing apparatus 1A according to the present modification is different from the additive manufacturing apparatus 1, mainly in that the placement of the three rail members 72 72 is changeable.

Figure 13:
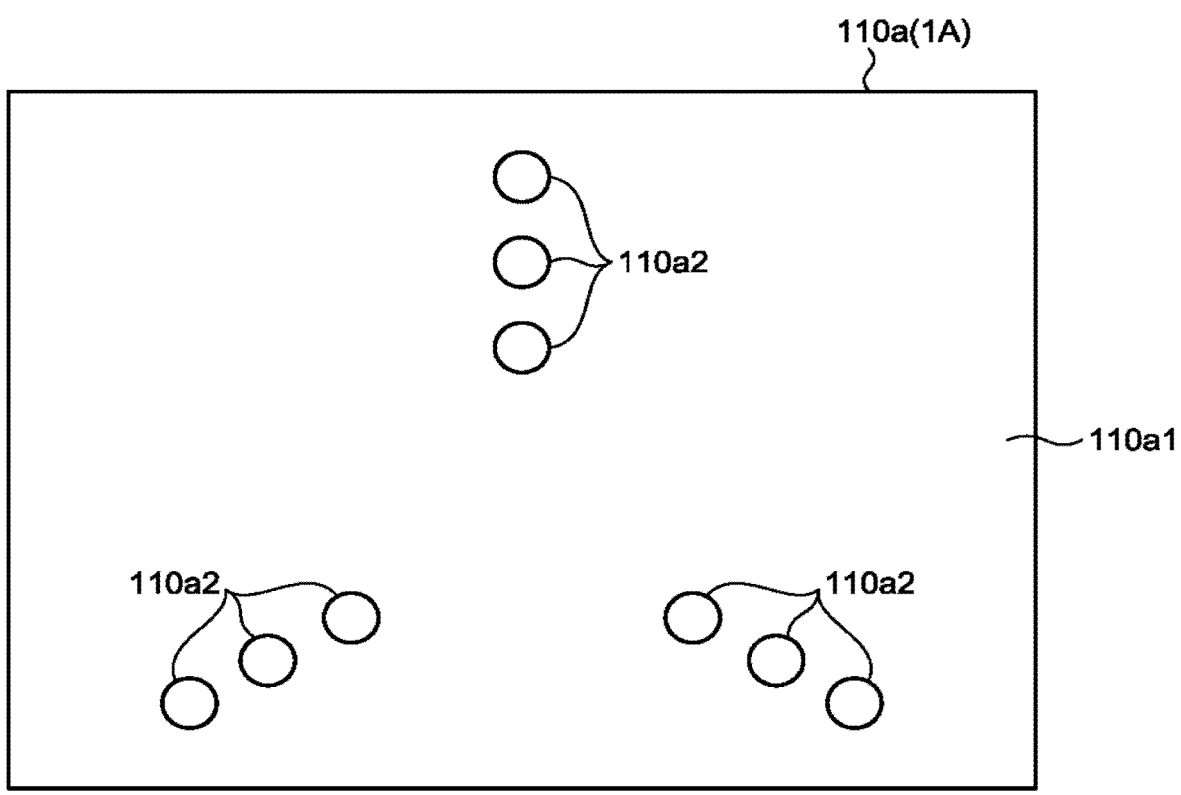
FIG. 13 is an exemplary schematic plan view of a base according to a first modification of the embodiment.

As illustrated in FIG. 13, in the present modification, a number (three in FIG. 13) of supports 110a2 are provided on a base 110a for each rail member 72. The supports 110a2 corresponding to one rail member 72 are spaced apart from each other in a direction crossing (orthogonal to) a direction (direction D1) along the rails 72d to 72g.

In the above configuration, the placement of the three rail members 72 can be changed by changing the position (support 110a2) of at least one rail member 72. This allows, for example, the distances among the three rail members 72 to be changed depending on the size of the object 100 to be manufactured. Thus, in case of manufacturing a relatively small-size object 100, the three rail members 72 are disposed with small distances thereamong, which results in inhibiting deflection of the arm members 74 due to the weight of the nozzle portion 28. Note that, the positions of the three rail members 72 can be changed by changing the position of at least one rail member 7, and thus the present modification is not limited to the three rail members 72 all of which are set to be changeable in positions. That is, the position of one or two of the rail members 72 may be set changeable.

Second Modification

An additive manufacturing apparatus 1B according to the present modification has a configuration similar to that of the additive manufacturing apparatus 1. However, the additive manufacturing apparatus 1B according to the present modification is different from the additive manufacturing apparatus 1, mainly in that the placement of the three rail members 72 is changeable.

Figure 14:
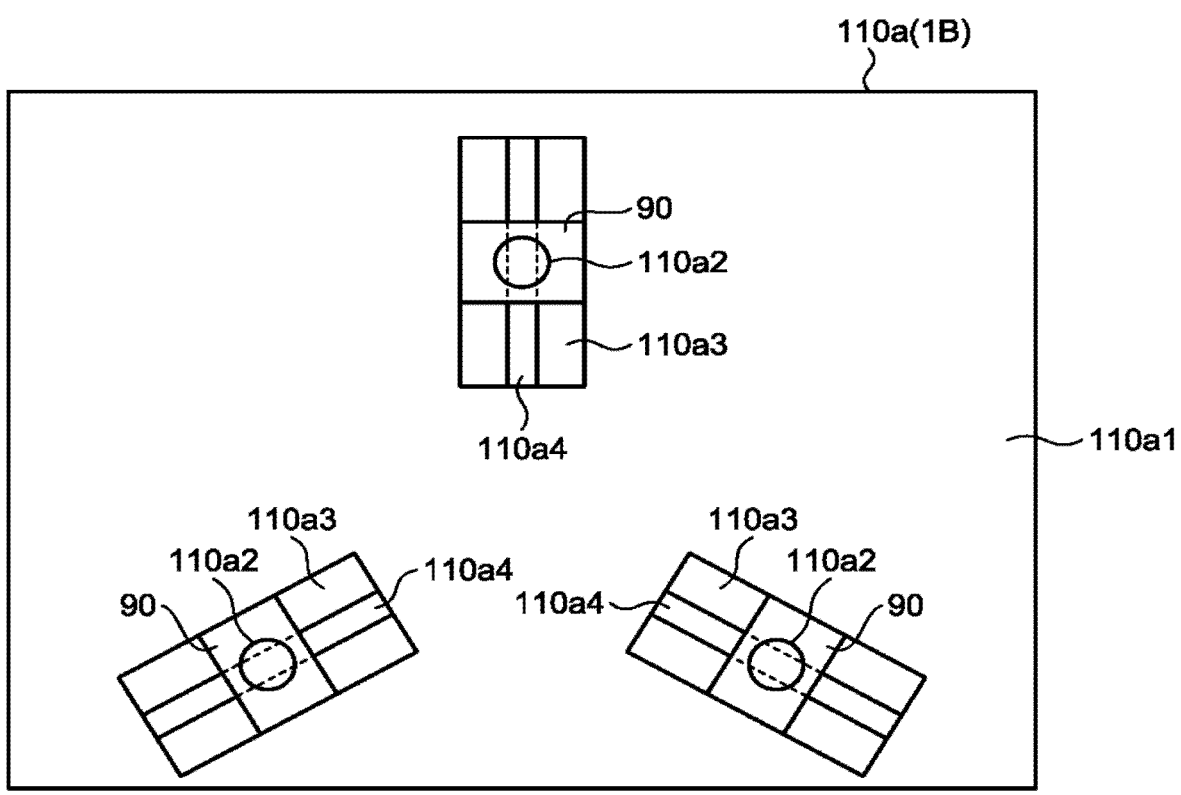
FIG. 14 is an exemplary schematic plan view of a base according to a second modification of the embodiment.

As illustrated in FIG. 14, in the present modification, a base 110a is provided with a slider member 90 for each rail member 72. The slider members 90 each include a support 110a2. The rail members 72 are supported on the supports 110a2.

The base 110a is provided with recessed supports 110a3. Each support 110a3 includes a rail 110a4 on a bottom face. The support 110a3 and a rail 110a4 extend in a direction crossing (orthogonal to) the direction (direction D1) along the rails 72d to 72g. The slider members 90 are movably supported on the rails 110a4. The slider members 90 may be moved manually or by a drive force of a drive source such as a motor.

In the above configuration, the positions of the three rail members 72 are changeable by changing the position (support 110a2) of at least one of the rail members 72. Thus, this modification can attain an effect similar to that of the first modification. Further, for example, from start to completion of manufacturing the object 100, the slider members 90 may be moved manually or automatically by the drive source to move the rail members 72 from respective predetermined positions (target positions) to positions (retracting positions)

with longer distances thereamong than those among the target positions. Thereby, the manufactured object 100 can be easily extracted.

Third Modification

An additive manufacturing apparatus 1C according to the present modification has a configuration similar to that of the additive manufacturing apparatus 1. However, the additive manufacturing apparatus 1C according to the present modification is different from the additive manufacturing apparatus 1 mainly in the feed tube 34 and the cable 210 which insert into the arm member 74.

Figure 15:
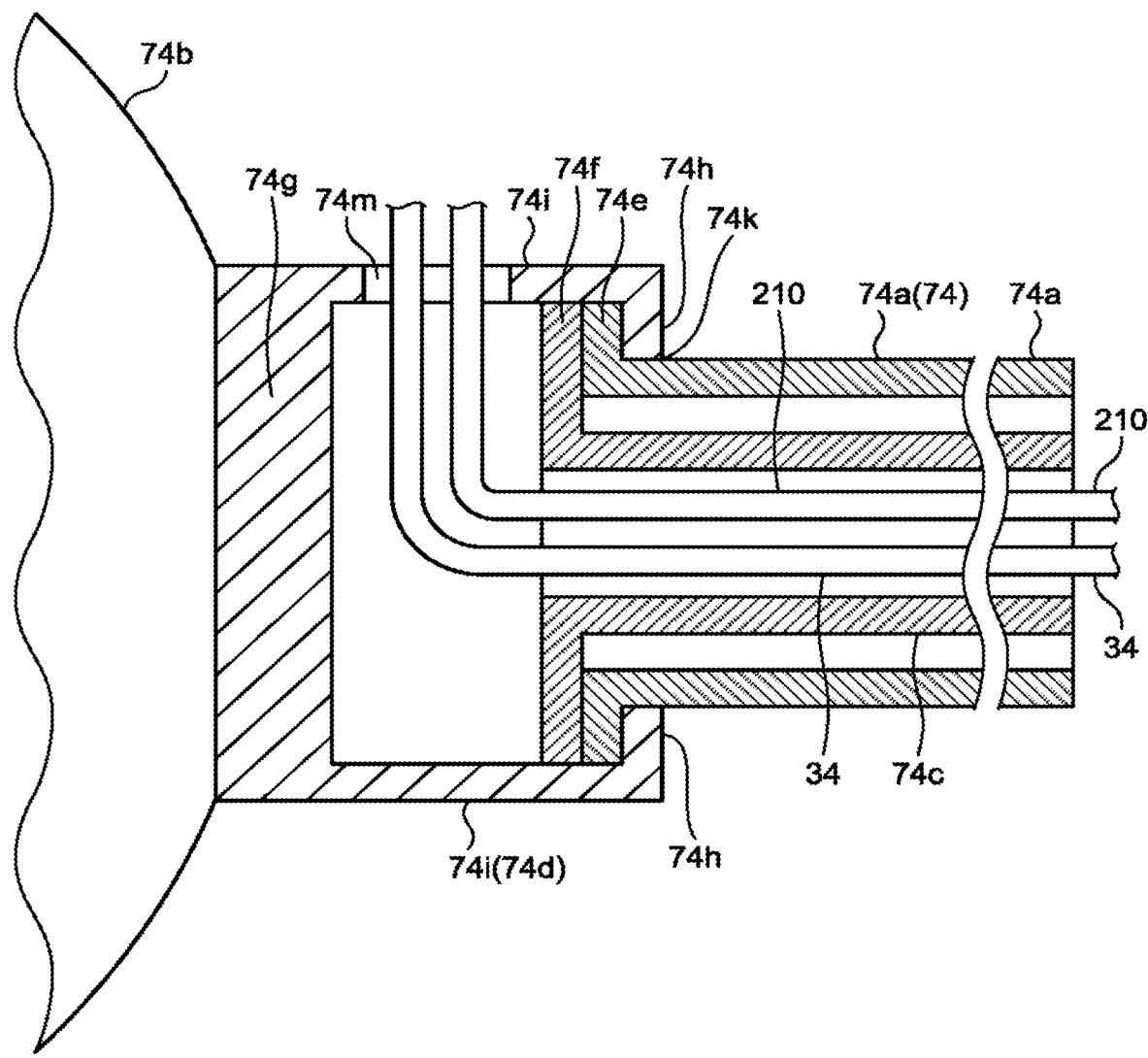
FIG. 15 is an exemplary schematic cross-sectional view of part of an arm member according to a third modification of the embodiment.

As illustrated in FIG. 15, the arm member 74 includes a tube member 74c and a connection member 74d, in addition to the ball screw shaft 74a and the ball 74b.

The connection member 74d is connected (fixed) to the ball 74b. The connection member 74d has walls 74g to 74i. The wall 74g is connected to the ball 74b. The walls 74h are positioned opposite the wall 74g. The walls 74i extend between the wall 74g and the walls 74h. The walls 74h and 74i are provided with openings 74k and 74m. The openings 74k and 74m communicate with the inside of the connection member 74d.

The ball screw shaft 74a has a tubular shape. The ball screw shaft 74a includes flanges 74e at an end closer to the ball 74b. The ball screw shaft 74a is inserted into the openings 74k, and the flanges 74e are positioned inside the connection member 74d. The flanges 74e face the inner faces of the walls 74h. The ball screw shaft 74a is connected to the connection member 74d and rotatable relative to the connection member 74d.

The tube member 74c is contained in the ball screw shaft 74a. The tube member 74c is tubular along the ball screw shaft 74a. The tube member 74c is provided to be rotatable relative to the ball screw shaft 74a. A bearing member may be provided between the tube member 74c and the ball screw shaft 74a. The tube member 74c includes flanges 74f at an end closer to the ball 74b. The flanges 74f overlap the flanges 74e. The tube member 74c is fixed to the connection member 74d.

The feed tube 34 and the cable 210 reach the nozzle 25 through the tube member 74c, the connection member 74d, and the opening 74m. The feed tube 34 may be provided in at least one of the arm members 74. The cable 210 may also be provided in at least one of the arm members 74. The feed tube 34 and the cable 210 may be provided in the same arm member 74 as described in the present modification, or in different arm members 74. The feed tube 34 is an example of a passage for the material 121, and the cable 210 is an example of a transmission path for the laser beam L (energy beam).

As described above, at least one of the arm members 74 includes the feed tube 34 (passage) for the material 121, and the cable 210 for the laser beam L (transmission path). Thus, the feed tube 34 and the cable 210 can be protected.

The above embodiment and modifications may be configured, for example, so that the feed device 31 supplies different kinds of materials 121 to the nozzle 25 to selectively supply the different kinds of materials 121 from the nozzle 25 at adjusted (changed) proportions. Thereby, a gradient material (functional gradient material) can be manufactured as the manufactured object 100 including the materials 121 at changing (gradually decreasing or gradually increasing) proportions according to the position (location) thereof. Specifically, for example, for forming the layer 110b, the control device 17 controls the feed device 31 to supply the materials 121 at the proportions set (stored) corresponding to each position of the manufactured object 100 in three-dimensional coordinates. Thereby, the object 100 can be manufactured as the gradient material (functional gradient material) in which the proportions of the materials 121 change in an arbitrary direction in three dimensions. An amount of change (rate of change) in the proportions of the material 121 per device length can be also variously set. In this case, the feed tube 34 may be provided for each material, or the feed tube 34 may be internally partitioned to provide passages for the respective materials in the feed tube 34. Furthermore, the feed device 31 may include a mixer that mixes the different kinds of materials 121 in advance and feeds the mixed materials 121 to the nozzle 25.

As described above, according to the embodiment and the modifications, the nozzle device 14 and the additive manufacturing apparatuses 1, 1A, 1B, and 1C having a novel structure for moving the nozzle portion 28 (nozzle 25) can be attained.

Certain embodiments have been described, but these embodiments have been presented by way of example only, and are not intended to limit the scope of the inventions. The novel embodiments may be embodied in a variety of other forms, and furthermore, various omissions, substitutions and changes may be made without departing from the spirit of the inventions. The accompanying claims and their equivalents are intended to cover such embodiments or modifications as would fall within the scope and spirit of the inventions.

For example, the number of the support mechanisms 71 (rail members 72, slider members 73, and arm members 74 may be three or more, for example, four. With four support mechanisms 71 provided, the rail members 72 may be disposed at, for example, the vertices of a virtual square. Further, the nozzle 25 may include the light source 41. The nozzle 25 may further include a blower fan as a cooler to cool the molten material 121 by blast. Furthermore, the arm members 74 may be extended and contracted as an element for changing the distance between the connections 71a and the connections 71b. The drive mechanism 80 may include a motor (actuator) for setting a relative angle between the arm members 74 (element) and the nozzle portion 28 (element).

The invention claimed is:

1. A nozzle device for an additive manufacturing apparatus, comprising:
   three or more rail members each including a plurality of distinct rails parallel with each other;
   three or more slider members connected to the three or more rail members to be movable along the three or more rail members, respectively;
   three or more arm members connected to the three or more slider members, and movably and rotatably supported in the three or more rail members through the three or more slider members, respectively;
   a nozzle portion rotatably connected to the three or more arm members to inject a material and emit an energy beam; and
   a drive mechanism including at least five actuators that set one of a relative position and a relative angle between each of combinations of two mutually connected elements among the rail members, the slider members, the arm members, and the nozzle portion, wherein
   the plurality of rails is rotatably provided around a rotation axis extending along each of the three or more rail members, such that the at least one of the arm members is provided with a passage for the material to be deposited on a platform, and the at least one of the arm members is provided with a transmission path for the energy beam emitted towards an object positioned on the platform.

2. The nozzle device according to claim 1, wherein one of the at least five actuators of the drive mechanism sets a relative position between the three or more rail members and the three or more slider members.

3. The nozzle device according to claim 1, wherein one of the at least five actuators of the drive mechanism sets a relative angle between the three or more rail members and the three or more arm members.

4. The nozzle device according to claim 1, wherein a distance between first connections and second connections is changeable, the first connections being connections between the arm members and the slider members, the second connections being connections between the arm members and the nozzle portion, and the actuators of the drive mechanism include an actuator that sets a relative position between the first connections and the second connections.

5. The nozzle device according to claim 1, wherein the arm members are movably connected to the slider members.

6. The nozzle device according to claim 1, wherein the three or more rail members are positioned to surround an object while jetted with the material and irradiated with the energy beam during manufacturing.

7. The nozzle device according to claim 1, wherein the nozzle device includes at least part of a cooler that cools the material irradiated with the energy beam.

8. The nozzle device according to claim 1, wherein the material is powder.

9. The nozzle device according to claim 1, wherein the material is a linear material.

10. An additive manufacturing apparatus comprising:
the nozzle device according to claim 1;
an energy beam source; and
a material feed device.

11. The additive manufacturing apparatus according to claim 10, wherein
the energy beam is a light beam,
the energy beam source is a light source, and
the light source supplies the light beam to the nozzle device through an optical fiber.

* * * * *